United States Patent
Pesta et al.

(10) Patent No.: US 6,361,098 B1
(45) Date of Patent: Mar. 26, 2002

(54) SEAT RISER FOLD AND TUMBLE MECHANISM

(75) Inventors: Christopher J. Pesta, Sterling Heights; Murali Govindarajalu, Southfield; Troy M. Cornell, Plymouth; Matthew E. Dukatz, Bloomfield Hills, all of MI (US)

(73) Assignee: DaimlerChrysler Corporation, Auburn Hill, MI (US)

( * ) Notice: Subject to any disclaimer, the term of this patent is extended or adjusted under 35 U.S.C. 154(b) by 0 days.

(21) Appl. No.: 09/271,472

(22) Filed: Mar. 17, 1999

(51) Int. Cl.⁷ .............................. B60N 2/02; A47C 1/02
(52) U.S. Cl. .................... 296/65.03; 297/331; 297/335; 248/503.1
(58) Field of Search ..................... 296/65.03, 65.05, 296/65.09; 248/503.1; 297/331, 332, 333, 335, 336

(56) References Cited

U.S. PATENT DOCUMENTS

| | | |
|---|---|---|
| 324,232 A | 8/1885 | Clarkson |
| 3,635,521 A | 1/1972 | Shivvers |
| 4,194,782 A | 3/1980 | Itoh |
| 4,227,736 A | 10/1980 | Lebault et al. |
| 4,368,916 A | 1/1983 | Blasin |
| 4,475,769 A | 10/1984 | Crawford et al. |
| 4,484,776 A | 11/1984 | Gokimoto et al. |
| 4,533,175 A | 8/1985 | Brennan |
| 4,573,225 A | 3/1986 | Wolf |
| 4,627,656 A | 12/1986 | Gokimoto et al. |
| 4,637,081 A | 1/1987 | Clark |
| 4,699,418 A | 10/1987 | Plavetich |
| 4,869,541 A | 9/1989 | Wainwright |
| 4,884,843 A * | 12/1989 | DeRees ....................... 297/331 |
| 5,039,155 A | 8/1991 | Suman et al. |
| 5,044,683 A | 9/1991 | Parsson |
| 5,150,946 A | 9/1992 | Marfilius et al. |
| 5,195,795 A | 3/1993 | Cannera et al. |
| 5,238,285 A * | 8/1993 | Holdampf et al. ....... 296/65.03 |
| 5,248,178 A | 9/1993 | Brambilla |
| 5,269,581 A | 12/1993 | Odagaki et al. |
| 5,322,344 A | 6/1994 | Hoffman et al. |
| 5,364,152 A | 11/1994 | Mastrangelo et al. |
| 5,368,355 A | 11/1994 | Hayden et al. |
| 5,372,398 A * | 12/1994 | Aneiros et al. .......... 296/65.03 |
| 5,383,699 A | 1/1995 | Woziekonski et al. |
| 5,393,116 A * | 2/1995 | Bolsworth et al. ....... 296/65.03 |
| 5,466,048 A | 11/1995 | Fowler et al. |
| 5,482,345 A * | 1/1996 | Bolsworth et al. ....... 296/65.03 |
| 5,492,386 A | 2/1996 | Callum |
| 5,498,051 A * | 3/1996 | Sponsler et al. ......... 296/65.03 |

(List continued on next page.)

Primary Examiner—Stephen T. Gordon
Assistant Examiner—Hilary Gutman
(74) Attorney, Agent, or Firm—Edwin W. Bacon, Jr.

(57) ABSTRACT

A vehicle seat assembly comprising a seat back and a seat bench that pivot relative to each other so that the seat back may be positioned generally upright to provide an upright seating position or positioned generally folded onto the seat bench to provide a cargo position. The seat assembly is mounted to the floor of the vehicle using front and rear latches which engage respective front and rear anchors. From the upright position, the seat assembly may be rotated forward to provide access to and egress from the area behind the seat. From the folded position, the seat assembly may be pivoted forward to provide additional cargo space. The seat assembly is configured to facilitate installing and removing the seat assembly by preventing the latches from contacting the anchors until such contact is desired. The seat assembly is also configured to facilitate moving the seat while in a vehicle and while removed from the vehicle. A cupholder is included in a cover for the seat assembly. The cupholder remains level while the seat assembly is moved between upright, folded, and tilted positions.

15 Claims, 6 Drawing Sheets

U.S. PATENT DOCUMENTS

| | | | |
|---|---|---|---|
| 5,529,376 A | | 6/1996 | Jovan et al. |
| 5,577,805 A | * | 11/1996 | Glinter et al. ............ 296/65.03 |
| 5,579,995 A | | 12/1996 | Giasson et al. |
| 5,593,208 A | | 1/1997 | Mitschelen et al. |
| 5,626,391 A | * | 5/1997 | Miller et al. .............. 296/65.09 |
| 5,634,686 A | * | 6/1997 | Okazaki .................. 296/65.09 |
| 5,658,043 A | | 8/1997 | Davidson |
| 5,743,596 A | * | 4/1998 | Chabanne ................... 297/336 |
| 5,765,894 A | * | 6/1998 | Okazaki et al. .......... 296/65.03 |
| 5,775,763 A | * | 7/1998 | Glinter et al. ........... 296/65.03 |
| 5,871,255 A | | 2/1999 | Harland et al. |
| 5,941,591 A | * | 8/1999 | Tsuge et al. .............. 296/65.09 |
| 5,951,086 A | * | 9/1999 | Hoshino et al. ......... 296/65.03 |
| 5,975,611 A | * | 11/1999 | Hoshihara et al. ....... 296/65.03 |
| 6,036,252 A | * | 3/2000 | Hecksel et al. .......... 296/65.03 |
| 6,039,401 A | * | 3/2000 | Rus ........................ 296/65.03 |
| 6,056,346 A | * | 5/2000 | Smuk ...................... 296/65.03 |
| 6,065,804 A | * | 5/2000 | Tanaka et al. ........... 296/65.03 |

* cited by examiner

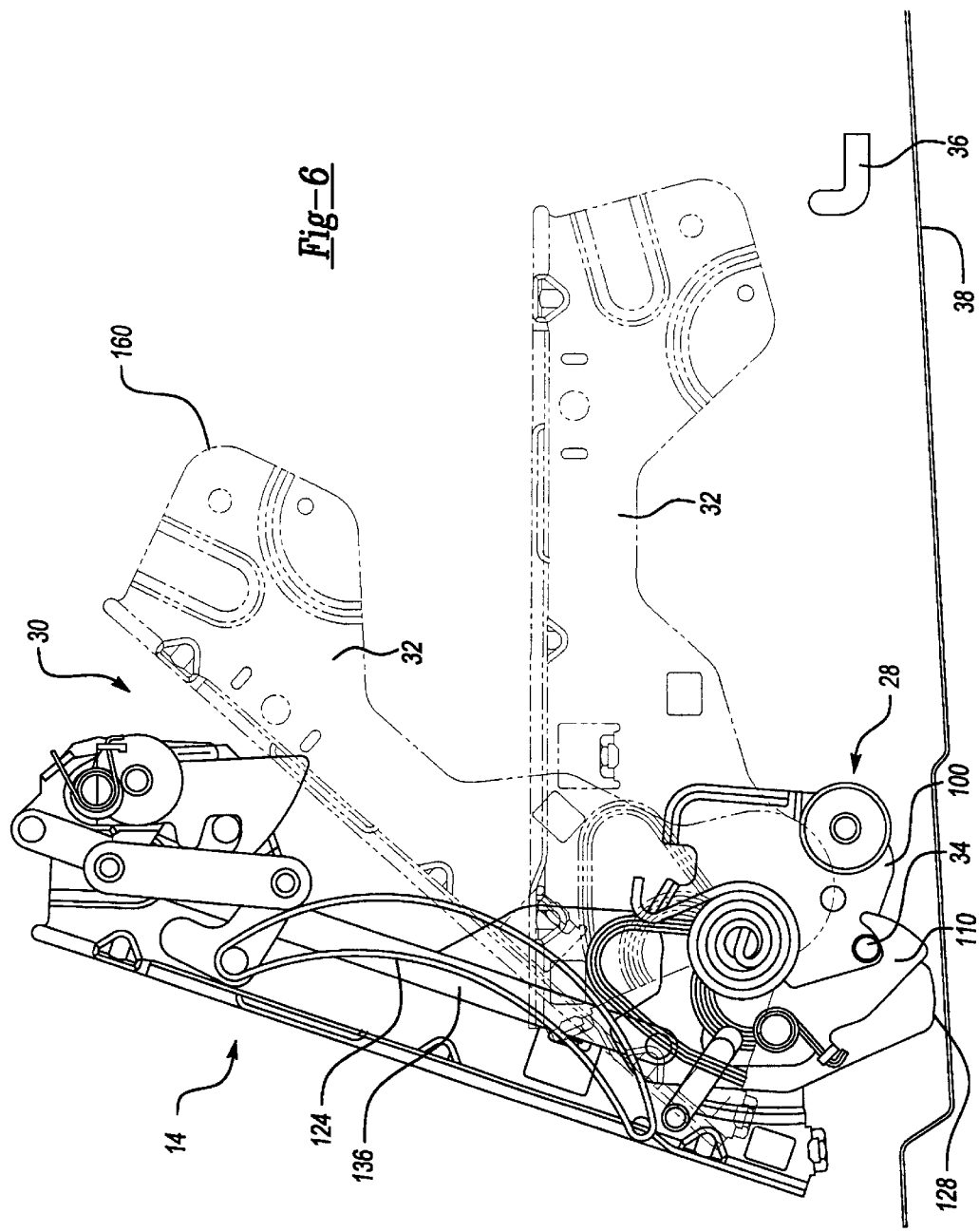

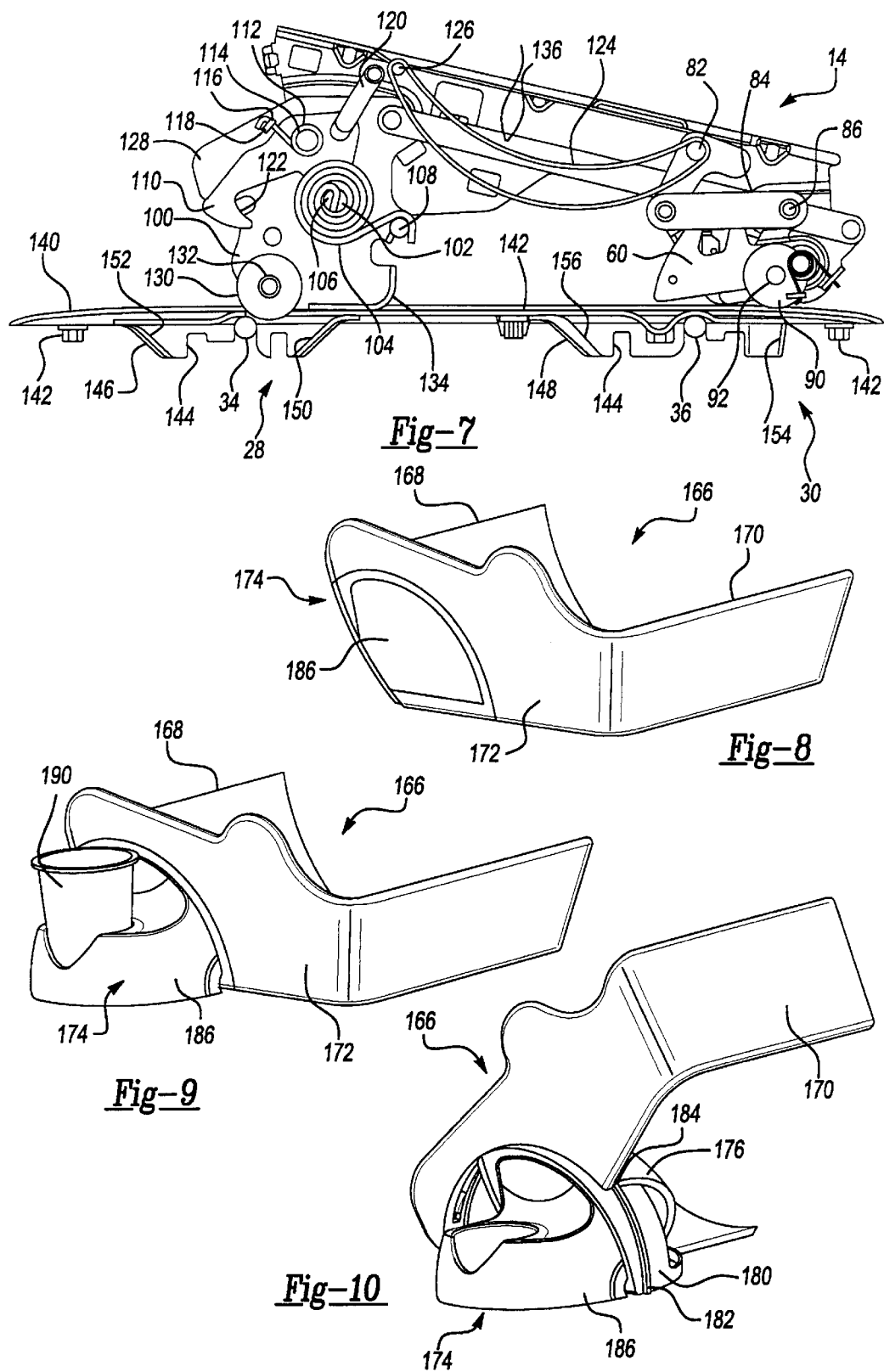

SEAT RISER FOLD AND TUMBLE MECHANISM

BACKGROUND OF THE INVENTION

1. Field of the Invention

The present invention relates generally to a seat assembly for vehicles and, more particularly, an improved seat assembly to facilitate use by the operator.

2. Discussion

The continued popularity of both mini-vans and full size vans has caused vehicle designers to focus on providing a smooth transition between configuring the vehicle for maximum passenger occupancy on one hand and maximum cargo space on the other. Present vans have a rear passenger area that includes one or two rows of bucket or split bench seats. These seats are typically removable in order to maximize cargo space behind the front driver and passenger seats. Alternatively, the seats maybe configured while in the van to provide maximum passenger occupancy.

The typical removable seat assembly includes front and rear anchors which are mounted to the floor of the passenger compartment. The seat has latches which are configured to engage the anchors for installation and disengage the anchors to enable removal of the seat. While such seat assemblies do provide the user flexibility in configuring the van for maximum passenger occupancy or cargo space, the seat assemblies are inconvenient and awkward to install and/or remove. Further, when installed, the typical seat assembly affords very little flexibility to an operator who prefers additional cargo area without completely removing the seat. Further yet, such seat assemblies do not typically enable convenient access to the row of seats or cargo space behind the given seat assembly.

In order to install or remove the seats from the vehicle, the operator typically must lift the seat assembly into the vehicle. Once the seat assembly is placed in the vehicle, the seat must be properly positioned to its installation position over the anchors. In a typical van, the seat assembly is placed in the vehicle through the rear door and must be moved forward to engage the anchors to complete the installation process. While the seat must only be moved a small distance from where it is lifted into the vehicle to its installed position, typical seat assemblies require the user to lift or walk the seat assembly to its position over the anchors. Such lifting or walking is awkward because the height of the passenger compartment does not enable the user to assume a comfortable posture for bending and lifting the seat to an installation location over the anchors. Present alternatives to actually lifting the seat include simply dragging the seat across the floor of the vehicle into its installed location. Dragging the seat risks damaging the floor of the vehicle, which is typically carpet or metal, and could potentially damage the latch mechanisms which engage the anchors to hold the seat assembly in place.

Present seat assemblies thus do not provide any convenient means for assisting the operator in moving the seat from a door of a vehicle to its installation location. Similarly, when the seat has been removed from the vehicle, the user typically must lift and carry the seat to its storage location. For example, once the seat is removed, the user may want to place the seat against the wall or in a corner of a garage. In order to move the seat, current seat assemblies require the user to lift and carry the seat assembly to its storage location.

Further, when displacing the seat assembly to its installation location, the user typically moves the seat over the anchors, which commonly protrude slightly above the floor of the vehicle. Present seat assemblies do not facilitate this operation. In particular, when moving the seat assembly from the back of the vehicle forward to its installation location, if the user does slide the seat, the latches mounted to the bottom of the seat interfere with the anchors in the floor of the vehicle, inhibiting properly positioning the seat to its installation location. More particularly, as the front latches move over the rear anchors, the front latches contact the rear anchors requiring the user to lift or walk the front latches over the rear anchors. This operation adds to the inconvenience that accompanies installation and removal of many existing seat assemblies.

Further yet, once the user has managed to position the seat to its installation location, many existing seat assemblies include latch mechanisms which are awkward and inconvenient. The user must typically position themselves in an awkward position to manipulate the seat in order to cause the front and rear and latch mechanisms to engage the respective front and rear anchors.

Thus, it is an object of the present invention to provide an improved seat assembly which facilitates displacing the seat assembly both into and out of the vehicle, which may be positioned to provide additional cargo space without completely removing the seat assembly, and which facilitates passenger access to and ingress from the vehicle.

SUMMARY OF THE INVENTION

This invention is directed to a seat assembly for a vehicle. The seat assembly includes a seat back and a seat bench connected to the seat back. The seat back pivots relative to the seat bench and pivots to a generally horizontal position onto the seat bench. The seat assembly also includes a riser having front and rear latches for engaging and disengaging respective front and rear anchors formed in a floor of the vehicle and is pivotable in a forward direction upon release of the rear latch. The riser supports the seat back and connects to the seat bench. The riser, the seat back, and the seat bench may assume any one of the following configurations (1) a seating position where the front and rear latches engage the respective front and rear anchors, and the seat back is in a generally upright position to enable an occupant to sit in the seat; (2) an entry position where the seat back is in a generally upright position, the rear latch is disengaged, and the riser is pivoted forward to facilitate access to and egress from an area behind the seat assembly; (3) a first cargo position where the seat back is pivoted to a generally horizontal position on top of the seat bench; (4) a second cargo position where the seat back is pivoted to a generally horizontal position on top of the a seat bench, the rear latch is disengaged, and the riser is pivoted forward to provide a cargo space vacated by the seat assembly; and (5) a removal position wherein the front and rear latches are disengaged enabling removal of the seat assembly.

This invention is also directed to a vehicle seat assembly which may be removed by disengaging the respective front and rear latches. A front roller is connected to the front latch of the riser, and a rear roller is connected to the rear portion of the riser. The front and rear rollers assume a first position to enable installation and removal of the seat assembly and assume a second position to facilitate moving the seat assembly when removed from the vehicle.

This invention is also directed to a vehicle seat assembly including a front roller connected to the front latch of the riser and a skid plate located in proximity to the front roller. The skid plate facilitates positioning the riser over the anchors during installation of the seat assembly.

This invention is also directed to a vehicle seat assembly including a riser having front and rear latches for engaging and disengaging respective front and rear anchors formed in a floor of the vehicle. The seat assembly further includes a cupholder mounted to the riser. The cupholder maintains a generally consistent orientation through a range of possible folded, tilted, and tumbled positions assumed by the riser.

This invention is also directed to a vehicle seat assembly including a cupholder mounted to the riser. The cupholder maintains a generally consistent orientation through a range of possible folded, tilted, and tumbled positions assumed by the riser.

These and other advantages and features of the present invention will become readily apparent from the following detailed description, claims and drawings.

BRIEF DESCRIPTION OF THE DRAWINGS

The drawings, which form an integral part of the specification, are to be read in conjunction therewith, and like reference numerals are employed to designate identical components in the various views:

FIG. 6 is a partly internal and partly external elevational view of the riser portion of the seat assembly in an upright and tumbled position;

FIG. 7 is an internal view of the riser and latch assemblies during displacement of the seat assembly to its installation location;

FIG. 8 is a perspective view of a cover for the bench portion of the seat assembly including a recessed cupholder;

FIG. 9 is a perspective view of the cover and cupholder of FIG. 8 showing the cupholder positioned to receive a cup; and FIG. 10 is a perspective view of the cover of FIGS. 8 and 9 when the attached seat assembly is tumbled forward.

DETAILED DESCRIPTION OF THE INVENTION

Figure 1A:
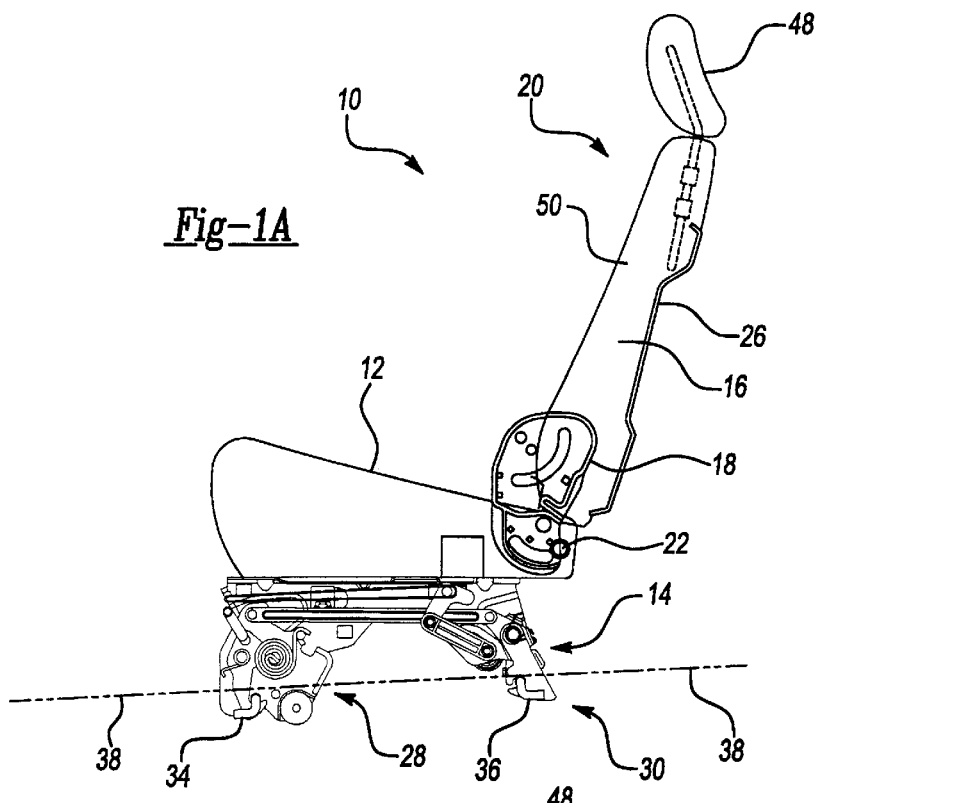
FIGS. 1A–1E are elevational views of the seat assembly arranged in various configurations in accordance with the principals of the present invention.

With reference to FIGS. 1–7, the seat assembly or vehicle seat 10 includes a seat bench 12 which is supported upon a riser assembly 14. A seat back 16 is attached to the seat bench 12 using a hinge and recliner latch assembly 18. Hinge and recliner latch assembly 18 maintains seat back 16 generally upright with respect to the generally horizontal seat bench 12 to provide an occupant position 20 of seat assembly 10. Hinge and recliner latch assembly 18, upon actuation of a lever 22, also enables seat back 16 to fold onto seat bench 12 to change the seat assembly 10 from an occupant position 20 to a folded or first cargo position 24, shown in FIG. 1C. In the first cargo position, the rear wall 26 of seat back 16 provides a generally horizontal surface on which cargo may be disposed.

Riser or riser assembly 14 includes a pair of front latch assemblies 28 and a pair of rear latch assemblies 30. Each respective pair of latch assemblies is mounted to a respective sidewall 32 of riser assembly 14. It will be understood by one skilled the art that the pair of front latch assemblies 28 are generally identical, and only one latch assembly will be described herein. Similarly, the pair of rear latch assemblies 30 are generally identical, and only one will be described herein. The latch assemblies 28 and 30 each include latch mechanisms, as will be described herein, for engaging respective front anchors or strikers 34 and rear anchors or strikers 36. Front latch assemblies 28 and rear latch assemblies 30 engage respective front anchors 34 and rear anchors 36. The front and rear anchors 34, 36 are rigidly mounted or fixed to the floor 38 of the vehicle 40.

Figure 1B:
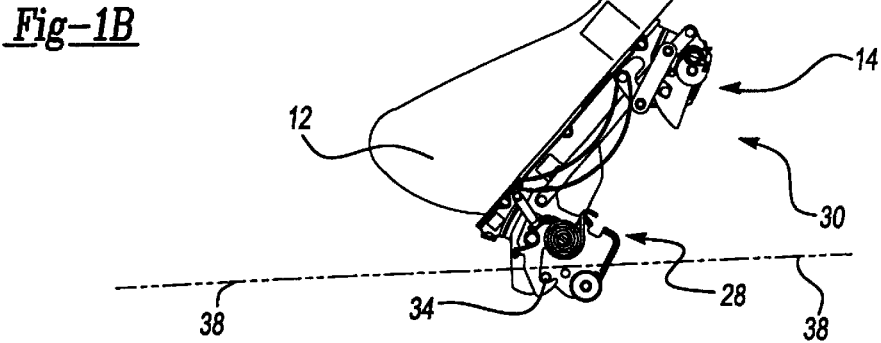
Figure 1C:
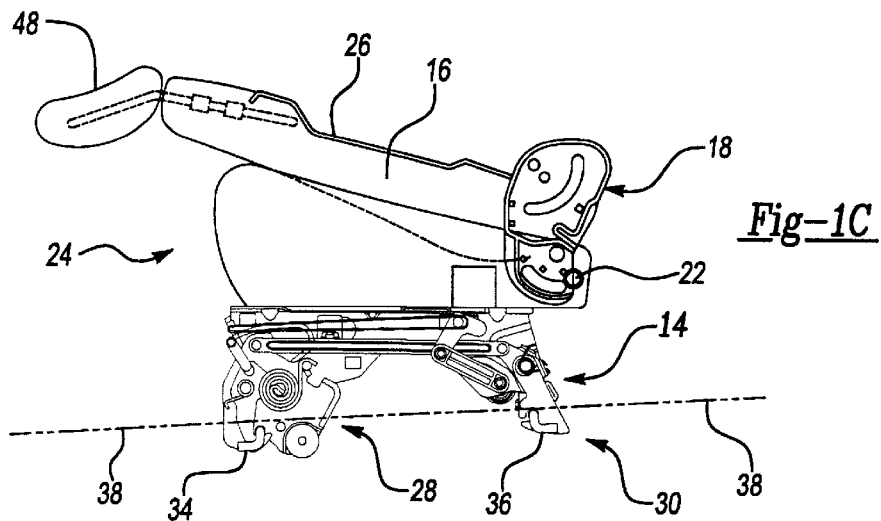
Figure 1D:
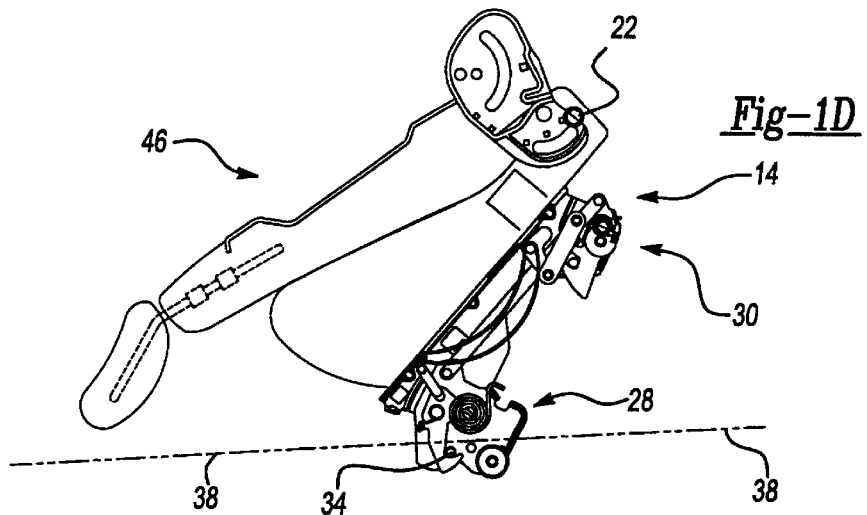
Figure 1E:
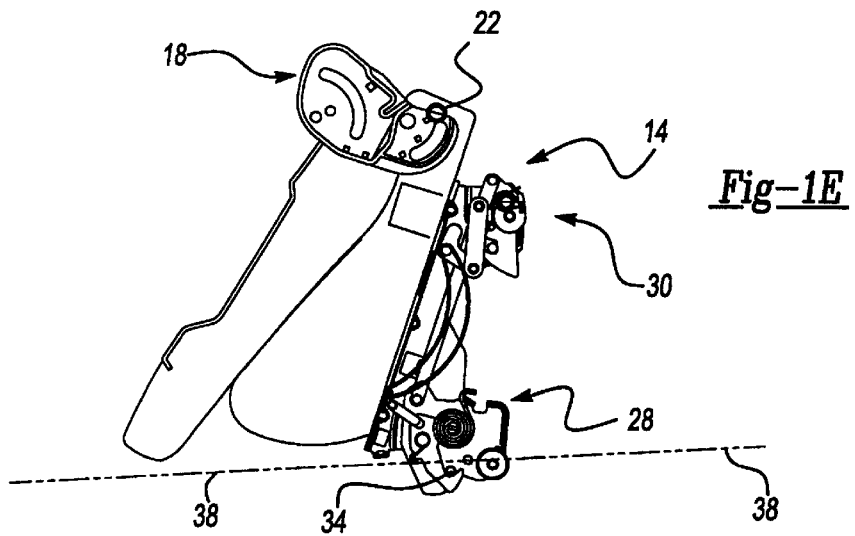

As can be seen in FIG. 1C, from the folded position 24, seat assembly 10 may pivot generally in proximity to front anchors 34 to provide a fold and tumble or second cargo position 46, shown in FIG. 1D. As can be also seen from FIGS. 1A and 1E, seat back 16 receives a removable head restraint 48. When installed, removable head restraint 48 limits forward tilting motion for seat assembly 10, as shown in FIG. 1D. By removing head restraint 48, seat assembly may 10 be tilted even further forward, as shown in FIG. 1E. To facilitate passenger ingress and egress to seats or cargo space located behind seat assembly 10, seat assembly 10 may be pivoted in proximity to front anchor or striker 34 while in the upright or occupant position 20 to move seat back 16 generally forward, to a tilt position 52 to move seat back 16 forward, as shown in FIG. 1B, thereby facilitating access and egress to the area behind seat assembly 10.

With particular respect to FIGS. 3–7, seat assembly 10 will be described in detail. As discussed above, riser assembly 14 includes a pair of front latch assemblies 28 and a pair of rear latch assemblies 30. Riser assembly 14 and attached seat bench 12 and seat back 16 generally pivot about front latch assembly 28 to effect the tilt, installation, and removal operations. With respect to rear latch assembly 30, rear latch assembly 30 includes a primary latch 60 which has a catch 62 that engages rear stricker 36 to provide structural retention to rear striker 36. Rear latch assembly 30 is pivotally connected to sidewall 32 of riser assembly 14 via fastener 64, such as a nut and bolt assembly or other similar fastener. In addition to primary latch 60, rear latch assembly 30 includes a secondary latch to more positively connect to rear latch assembly 36 to eliminate noises such as buzz, squeak, and rattle. The secondary latch includes a support 66 which rests on rear striker 36 when rear latch assembly 30 engages rear striker 36. The secondary latch also includes an anti-rattle latch 68 which has a catch 70 which engages the bottom of rear striker 36. Thus, support 66 and anti-rattle latch 68 apply opposing force to rear striker 36 to minimize buzz, squeak and rattle noises.

Figure 3:
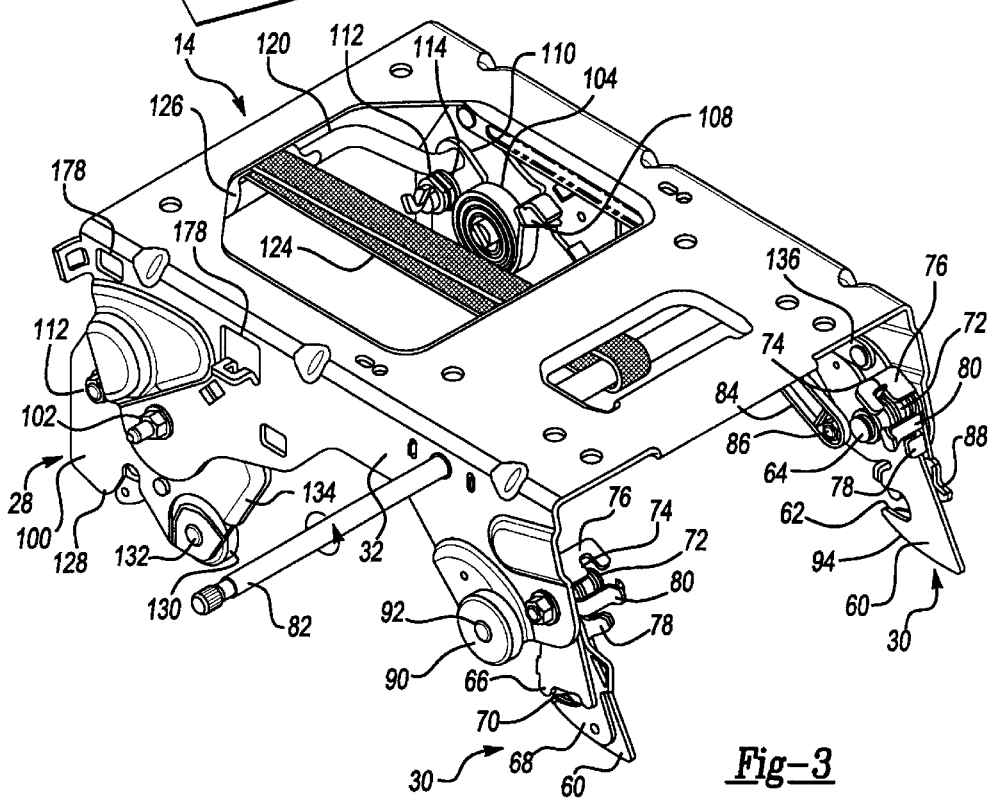
FIG. 3 is a perspective view of the riser portion of the seat assembly of FIGS. 1 and 2.
Figure 4:
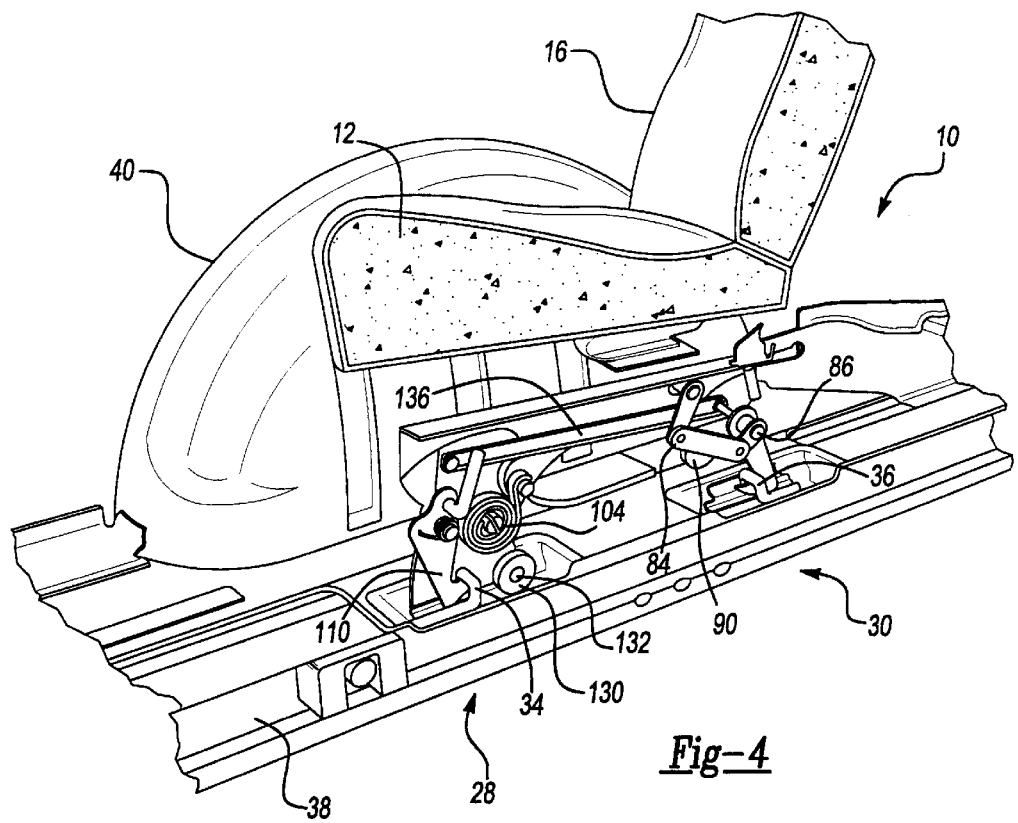
FIG. 4 is an internal, perspective view of the latch mechanism of the seat assembly.

A torsion spring 72 is formed on fastener 64 in an interior portion of riser assembly 14. Torsion spring 72 engages a spring seat 74 formed in an arm 76 of support 66. Torsion spring 72 exerts a generally clockwise force, as shown in FIG. 3 upon arms 78, 80 formed in primary latch 60 and anti-rattle latch 68, respectively. This generally clockwise force exerted by torsion spring 72 maintains engagement of primary latch 60 and anti-rattle latch 68 with rear striker 36.

Figure 5:
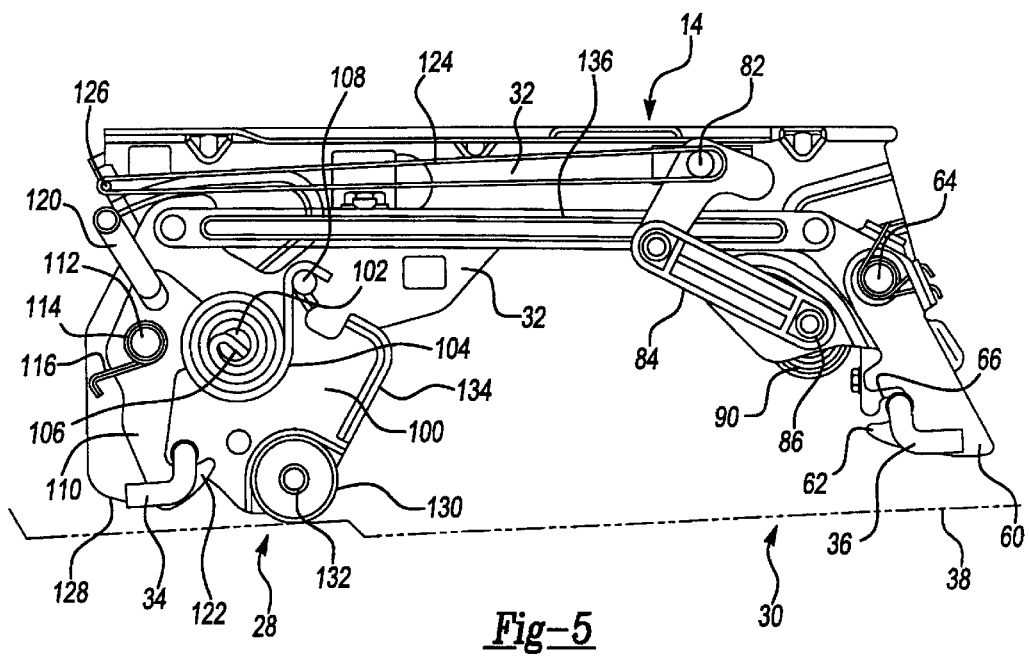
FIG. 5 is an elevational interior view of the latch assemblies of the seat assembly.

In order to release catches 62, 70 of the respective latches 60, 68, the operator rotates a lever 82 in a generally counterclockwise direction. As best seen in FIG. 5, lever 82 rigidly connects to linkage 84 at one end of linkage 84. The other end of linkage 84 is fastened, such as by a rivet 86, to primary latch 60. Counterclockwise rotation of lever 82 causes corresponding counterclockwise rotation of primary latch 60 about fastener 64, thereby disengaging catch 62 from rear striker 36. During counterclockwise rotation of primary latch 60, primary latch 60 engages a stop 88 formed in anti-rattle latch 68, thereby rotating anti-rattle latch 68 in a counterclockwise direction to release catch 70 from rear striker 36. As will be explained in greater detail herein, primary latch 60 includes a lower edge 94 which is formed to slide upon rear striker 36 so that catches 62, 70 can engage rear striker 36 during installation.

Riser assembly 14 also includes a pair of rear rollers 90 riveted for rotational movement to sidewall 32 using a rivet 92 or other fastener as is known in the art. As will be described in greater detail herein, rear latch assembly 30 is generally pivotable in a clockwise direction with respect to FIG. 3 so that latch assembly 30 generally retracts within sidewalls 32 of riser assembly 14., When rear latch assembly 30 retracts, rollers 90 are positioned on riser assembly 14 so that the rear portion of riser assembly 14 may be displaced and rolled about on rear rollers 90.

Riser assembly 14 also includes a front latch assembly 28. Front latch assembly 28 includes a front latch plate 100 which pivotally connects to the sidewall 32 of riser assembly 14 via a threaded fastener 102, such as a nut and bolt assembly. On the interior of latch plate 100, a clock spring 104 is wound about a slot 106 formed in fastener 102. At its other end, clock spring 104 engages an ear 108 formed in latch plate 100. As can be seen with respect to FIGS. 3, 5, and 7, when riser assembly 14 is rotated from a tilted position to an installed position, as shown in FIG. 7, clock spring 104 is wound through the rotational movement of threaded fastener 102 in conjunction with rotational movement of riser assembly 14 while latch plate 100 remains fixed. In a wound position, clock spring 104 is arranged to unwind in a counterclockwise direction with respect to FIG. 5 if the end formed in ear 108 remains fixed. That is, clock spring 104 is preferably formed to impart counterclockwise rotational movement of riser assembly 14 about threaded fastener 102, as best seen with respect to FIG. 5. When the operator, rotates lever 82 in a counterclockwise direction to release rear latch assembly from rear striker 36, clock spring 104 causes riser assembly 14 to pivot about threaded fastener 102 to a tilted position, as shown in FIGS. 1B and 1D.

Front latch assembly 28 also includes a front latch 110 which is pivotally connected to latch plate 100 via a threaded fastener 112, such as a nut and bolt assembly. On the interior of riser assembly 14, threaded fastener 112 includes a spring 114 having an arm 116 which engages an ear 118 of latch 110. As viewed with respect to FIG. 5, spring 114 exerts a generally counterclockwise pivotal force on latch 110 about the pivot point defined by threaded fastener 112. A latch release 120 interconnects each respective left and right latches 110. Latch release 120 is formed so that by pulling the release generally rearward, latch release 120 causes a generally clockwise rotation of latch 110 so that catch 122 of latch 110 releases front striker 34. As shown in FIG. 5, a generally continuous strap 124 is run between lever 82 and a loop 126 formed in latch release 120. Strap 124 facilitates release of latches 110 by the operator, as the operator does not have to reach as far under the seat to activate latch release 120.

Latch plate 100 includes a support 128 which resets on the floor 38 of the vehicle when seat assembly 10 is installed in an upright position. Support 128 assists in limiting movement of front latch assemblies 28 about front strikers 34. Latch plate 100 also includes a roller 130 attached to latch plate 100. Roller 130 attaches to latch plate 100 for rotational movement about rivet 132. Roller 130 is formed on latch plate 100 so that when seat assembly 10 is disengaged and/or removed from the vehicle, roller 130 contacts the ground so that seat assembly 10 may be easily pushed upon front rollers 130 and rear rollers 90, thereby providing a convenient means for moving the seat when not installed. Latch plate 100 also includes a skid plate 134 which is formed to facilitate positioning seat assembly 10 to its installation location by preventing contact between roller 130 or any other portion of front latch assembly 28 and rear striker 36 when rotation seat assembly 10 rearward about front latch assembly 28 to its installation location.

Figure 2:
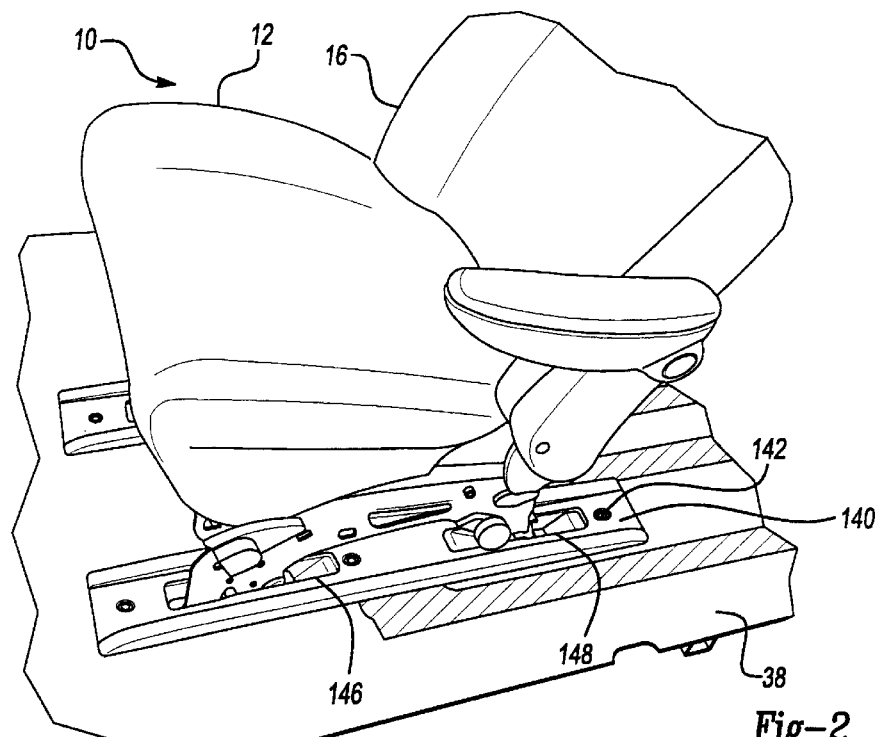
FIG. 2 is a perspective view of the seat assembly of the present invention showing an escutcheon plate.

As best seen in FIGS. 2 and 7, installation and removal of seat assembly 10 is facilitated through use of an escutcheon plate 140 which is mounted to the floor 38 of the vehicle 40 via screws which pass through mounting holes 142. Escutcheon plate is properly located upon floor 38 by matching locator notches 144 with matching locator bosses (not shown) in floor 38. Escutcheon plate 140 includes a front well 146 and rear well 148. Front well 146 includes a rear ramp 150 and a front ramp 152. Similarly, rear well 148 includes a rear stop 154 and a front ramp 156. Escutcheon plate 140 is formed so that the rear ramp 150 of front well 146 engages roller 130 so that roller 130 drops down into front well 146 of escutcheon plate 140 and is held between rear ramp 150 and front striker 34 so that seat assembly 10 maybe tilted forward so that front latch 110 may engage front striker 34. On the other hand, rear well 148 and roller 90 are positioned so that roller 90 does not drop into rear well 148, preventing rear latch assembly 30 from prematurely contacting rear striker 36. Further, rear well 148 and skid In operation, seat assembly 10 is installed by first lifting seat assembly 10 into the vehicle via a rear or side door. Relying on rollers 90 and 130, seat assembly 10 may be rolled into the installation position. Particularly, each roller 130 on the respective left and right latch assemblies 28 are positioned in the respective front wells 146 of escutcheon plate 140, thereby rotating latch plate 100 generally counterclockwise as seen with respect to FIG. 7. When rollers 130 proceed down rear ramp 150 of front well 146, the operator then lifts the rear portion of seat assembly 10 to cause riser 14 to pivot about roller 130. Seat assembly 10 is pivoted so that the lower edge of latch plate 110 slides so that catch 122 engages front striker 34. During this operation, latch plate 100 rotates from the position shown in FIG. 7 counterclockwise 90 degrees so that support 128 rests upon the floor 38 of the vehicle. Once catch 122 engages striker 34, the operator then pivots riser assembly 14 of seat assembly 10 rearward about a pivot point defined by threaded fastener 102. Once latch 110 engages front striker 34, latch plate 100 remains fixed in the position as shown in FIG. 3.

When riser assembly 14 is pivoted generally rearward with respect to the pivot point defined by threaded fastener 102, linkage 136 causes rear latch assembly 30 to rotate from a retracted position shown in FIG. 7 to a generally extended position shown in FIGS. 3 and 5. The operator continues to rotate seat assembly 10 rearwardly so that lower edge 94 of the respective primary latches 60 slide across rear striker 36 so that catches 62, 70 engage rear striker 36. Following this operation, the operator then rotates lever 22 to move seat back 16 from a folded position to an upright position.

To remove seat assembly 10 from vehicle 40, seat back 16 must first be folded onto seat bench 12 by releasing recliner latch assembly 18 using lever 22. Once seat back 16 is folded onto seat bench 12, the operator rotates lever 82 in a counterclockwise direction, as shown in FIG. 3, causing primary latch 60 and anti-rattle latch 68 to pivot about the pivot point defined by fastener 64. Pivotal movement of primary latch 60 and anti-rattle latch 68 releases the respective catches 62, 70 from rear strikers 36. Once the primary latch 60 and anti-rattle latch 68 disengage rear strikers 36, wound clock spring 104 causes riser assembly 14 to pivot about the pivot point defined by threaded fastener 102 to a tilted position. Support 128 on latch plate 100 limits this forwarding pivoting movement. Typically, the forwarded pivoting movement is approximately 40 degrees, as shown at 160 of FIG. 6.

During this pivotal movement, linkage 136 causes rear latch assemblies 130 to retract within riser assembly 14. Also, strap 124 becomes slackened during this pivoting motion. The operator then pulls generally rearwardly and downwardly on strap 124 to disengage front latches 110 from front strikers 34. Once disengaged, the operator then may pivot seat assembly 10 rearwardly. Because front latches 110 are disengaged from front strikers 34, rotation of seat assembly 10 rearwardly causes seat assembly 10 to pivot about roller 130 rather than the pivot point defined by threaded fastener 102, creating a larger radius of rotation. This larger radius raises front latch 110 away from front striker 34 so that it cannot reengage front striker 34 during the rearward pivoting of seat assembly 10. During this rotation, latch plate 100 moves in conjunction with riser assembly 14 about roller 130, maintaining rear latch assemblies 30 in a retracted position so that seat assembly 10 rests upon front rollers 130 and rear rollers 90. Seat assembly 10 may then be removed from the vehicle by pushing the seat towards the rear of the vehicle causing front rollers 130 to roll up the rear ramp 150 of escutcheon plate 140.

In addition to installation and removal, seat assembly 10 may be tilted forward with seat back 16 in an upright position, as shown in FIG. 1B. To effect the tilt operation with seat back 16 in an upward position, the operator rotates lever 82 in a generally counterclockwise direction as shown in FIG. 3, thereby releasing latches 60, 68 from rear striker 36. As described above, clock spring 104 causes rotational movement of seat assembly 10 about the pivot point defined by threaded fastener 102. This displaces the seat to an upright, tilted position so that passengers may more conveniently pass behind the tilted seat.

From a folded, tumbled position, seat assembly 10 may be rotated further forward to provide additional cargo area behind the folded, tilted seat. In particular, with head restraint 48 removed, an additional approximately 20 degrees rotation may occur, as shown in FIG. 1E. This rotation, however, does not occur about the pivot point defined by fastener 102 but occurs by pivoting latch plate 100 about forward striker 34. From this augmented tumble position, seat assembly 10 may also be removed as described above herein by pulling strap 124 and rotating seat assembly 10 in a rearward direction.

FIGS. 8–10 depict an additional feature of the present invention, namely, a cover assembly 166 which may be installed upon seat assembly 10 in order to cover the front, side, and a portion of the rear sections of riser assembly 14. Cover assembly 166 is shown as a left side cover assembly. A similarly configured cover may be used to cover the right side of seat assembly 10. As shown in FIGS. 8–10, cover assembly 166 includes a front wall 168, a rear wall 170, and a sidewall 172. Cover assembly 166 may be attached to seat assembly 10 using screws, plastic tabs, or similar fastening devices. As shown in FIG. 9, cover assembly 166 includes a cupholder assembly 174. Cupholder assembly 174 includes a base 176 which attaches to riser assembly 14 using tabs which engage mounting holes 178, shown in FIG. 3. Base 176 houses a slide housing 180 which includes a slide 182 which fits within a guide track 184 formed in base 176 so that slide housing 180 may be rotated relative to cover assembly 166 and base 176. A cupholder 186 is pivotally recessed within slide housing 180. Cupholder 186 is pulled from slide housing 180 so that it is in position to receive a cup 190 as shown in FIGS. 9 and 10.

A particular feature of cupholder assembly 174 is that seat assembly 10 may be displaced to either the tilt position, the fold and tumble position, or the maximum fold and tumble position while maintaining slide housing 180 and cupholder 186 in a generally level position so as to not disturb the contents of cup 190. Thus, the user may place their cup in cupholder 186 without concern that tilting or tumbling seat assembly 10 will disturb the contents of cup 190.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed is:

1. A seat assembly for a vehicle comprising:

a seat back;

a seat bench operatively connected to the seat back, wherein the seat back pivots relative to the seat bench and is pivotable between to a generally upright position and a generally horizontal position onto the seat bench; and a riser assembly having front and rear latch assemblies including a front and rear latch for engaging and disengaging respective front and rear anchors formed in a floor of the vehicle and is pivotable in a forward direction upon release of the rear latch, the riser assembly supporting the seat back and connected seat bench, a latch plate positioned on a forward section of the riser assembly; the latch plate pivotable about the floor of the vehicle upon release of the front latch, whereby as the front latch is disengaged and the riser assembly moves rearward, the riser assembly pivots about the floor of the vehicle, thereby preventing the front latch from engaging the front anchor;

a latch for locking the seat back in one of the generally upright position and the generally horizontal position, the latch being releasable to enable varying the position of the seat back between the generally upright and generally horizontal positions;

wherein the riser assembly, the seat back, and the seat bench may assume any one of the following configurations:

a seating position wherein the front and rear latches engage the respective front and rear anchors, and the seat back is in the generally upright position to enable an occupant to sit on the seat bench;

an entry position wherein the seat back is in the generally upright position, the rear latch is disengaged, and the riser assembly is pivoted forward to facilitate access to and egress from an area behind the seat assembly;

a first cargo position wherein the seat back is pivoted to the generally horizontal position on top of the seat bench;

a second cargo position wherein the seat back is pivoted to the generally horizontal position on top of the seat bench, the rear latch is disengaged, and the riser assembly is pivoted forward to provide a cargo space vacated by the seat assembly; and a removal position wherein the front and rear latches are disengaged enabling removal of the seat assembly.

2. The seat assembly of claim 1 wherein the second cargo position further comprises:

a partial cargo position defined by pivoting the riser assembly to a first predetermined position; and a full cargo position defined by further pivoting the riser assembly to a second predetermined position.

3. The seat assembly of claim 1 wherein the removal position further comprises placing the seat assembly in the first cargo position, then releasing the front latch to enable removal of the seat assembly.

4. The seat assembly of claim 1 further comprising a spring assembly for pivoting the riser assembly forward upon release of the rear latch.

5. A seat system for a vehicle, the seat system comprising:

a seat assembly having a bench portion and a back portion, wherein the back portion is foldable onto the bench portion;

a riser assembly supporting the seat assembly;

a rear latch positioned on a rear section of the riser assembly, the rear latch including a first latch for selectably engaging and disengaging a rear anchor, the first latch maintaining attachment of the riser assembly to the rear anchor when engaged; and a second latch for minimizing movement of the first latch about the rear anchor;

a latch plate positioned on a forward section of the riser assembly and contacting a floor of the vehicle, the latch plate having a pivot point for the riser assembly about the latch plate;

a front latch coupled to the latch plate for selectably engaging and disengaging a front anchor, the front latch further comprising a front latch spring for exerting a force to maintain engagement of the front latch with the front anchor and a front latch release for applying a force opposite the spring force of the front latch spring for disengaging the front anchor, wherein when the rear latch is disengaged and the front latch is engaged, the riser assembly is tilted forward about the pivot point to a predetermined position, so that when the front latch is then disengaged and the riser assembly moves rearward, the riser assembly pivots about the floor of the vehicle, thereby preventing the front latch from engaging the front anchor.

6. The seat system of claim 5 wherein while the riser assembly assembly moves forward to the predetermined position, the riser pivots about the pivot point.

7. The seat system of claim 5 wherein while the riser assembly moves forward from the predetermined position, the latch plate and the riser assembly pivot cooperatively about the front anchor.

8. The seat system of claim 5 further comprising a rear latch spring for exerting a force to maintain engagement of the rear latch with the rear anchor and a rear latch release for applying a force opposite the spring force of the rear latch spring for disengaging the rear anchor.

9. The seat system of claim 8 further comprising a tumble spring for exerting a forward force to move the riser assembly forward about the first pivot point upon disengagement of the rear latch.

10. The seat system of claim 5 wherein the rear latch moves relative to the riser assembly, and further comprising a linkage coupling the latch plate to the rear latch so that as the riser assembly moves forward, the rear latch pivots inward toward the riser assembly, and when the riser assembly moves rearward, the rear latch pivots outward away from the riser assembly.

11. The seat system of claim 5 wherein the second latch further comprises:

a third latch for applying a force to the rear anchor; and a support for applying a force to the rear anchor in opposition to the third latch.

12. A riser assembly for a seat in a vehicle, the riser assembly comprising:

a riser supporting the seat;

a rear latch positioned on a rear section of the riser for selectably engaging and disengaging a rear anchor;

a latch plate positioned on a forward section of the riser and contacting a floor of the vehicle, the latch plate having a pivot point for the riser about the latch plate, wherein while the riser moves forward to a predetermined position, the riser moves about the pivot point;

a front latch coupled to the latch plate for selectably engaging and disengaging a front anchor, the front latch further comprising a front latch spring for exerting a force to maintain engagement of the front latch with the front anchor and a front latch release for applying a force opposite the spring force of the front latch spring for disengaging the front anchor, wherein when the rear latch is disengaged and the front latch is engaged, the riser is tilted forward about the pivot point to the predetermined position, so that when the front latch is then disengaged and the riser moves rearward, the riser pivots about the floor of the vehicle, thereby preventing the front latch from engaging the front anchor.

13. The riser assembly for a seat of claim 12 further comprising a rear latch spring for exerting a force to maintain engagement of the rear latch with the rear anchor and a rear latch release for applying a force opposite the spring force of the rear latch spring for disengaging the rear anchor.

14. The riser assembly for a seat of claim 13 wherein the rear latch moves relative to the riser, and further comprising a linkage coupling the latch plate to the rear latch so that as the riser moves forward, the rear latch pivots inward toward the riser, and when the riser moves rearward, the rear latch pivots outward away from the riser.

15. The riser assembly for a seat of claim 14 wherein the latch plate further comprises a roller operably attached to the latch plate for enabling pivoting of the latch plate about the floor of the vehicle.

* * * * *